Feb. 13, 1934.    D. G. TAYLOR    1,946,598
THERMOSTATIC SWITCH
Filed May 22, 1931    2 Sheets-Sheet 1
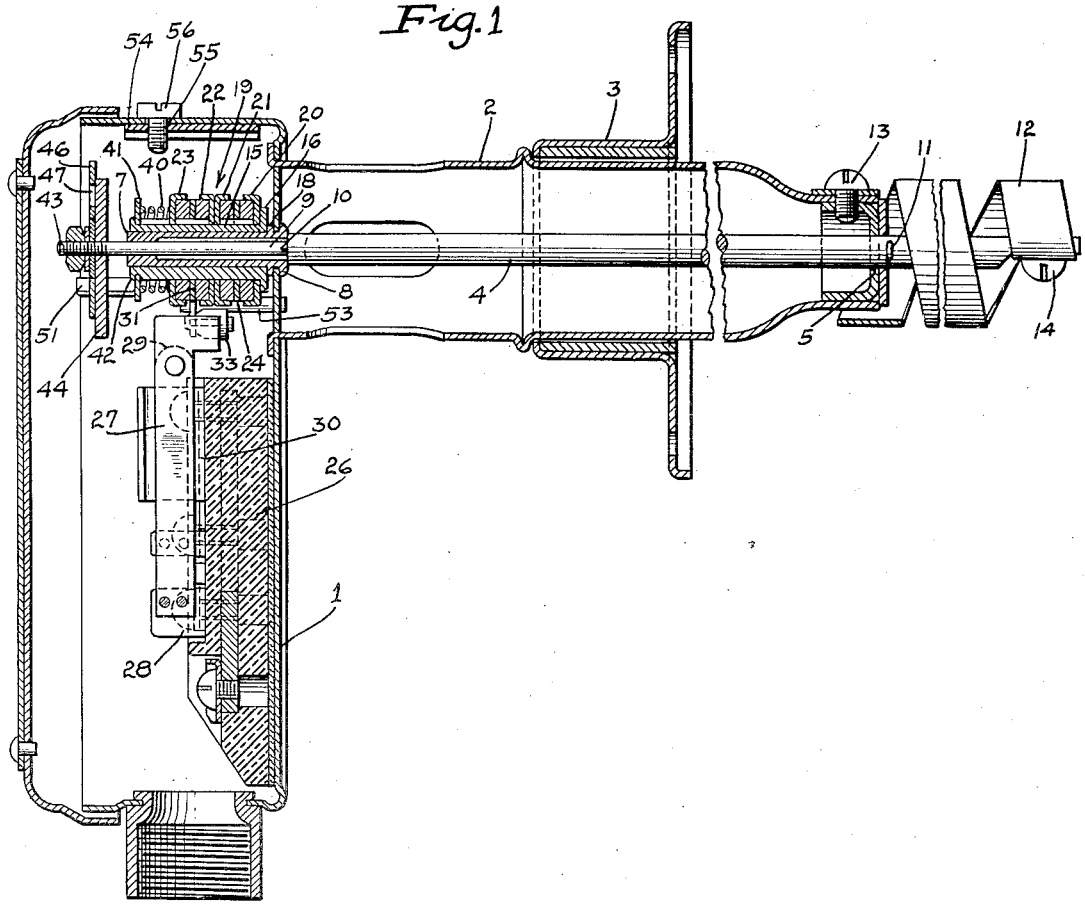
INVENTOR
DANIEL G. TAYLOR
By
ATTORNEYS Feb. 13, 1934.  D. G. TAYLOR  1,946,598
THERMOSTATIC SWITCH
Filed May 22, 1931  2 Sheets-Sheet 2
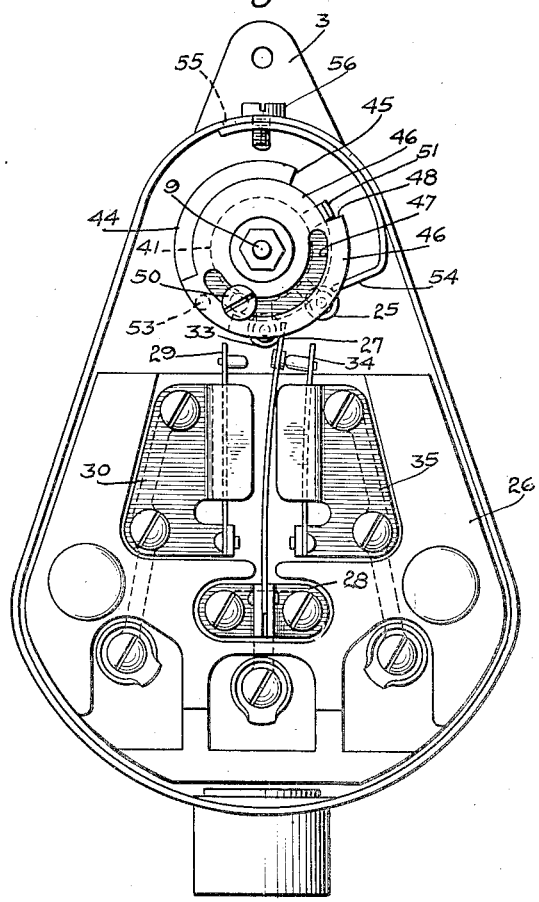
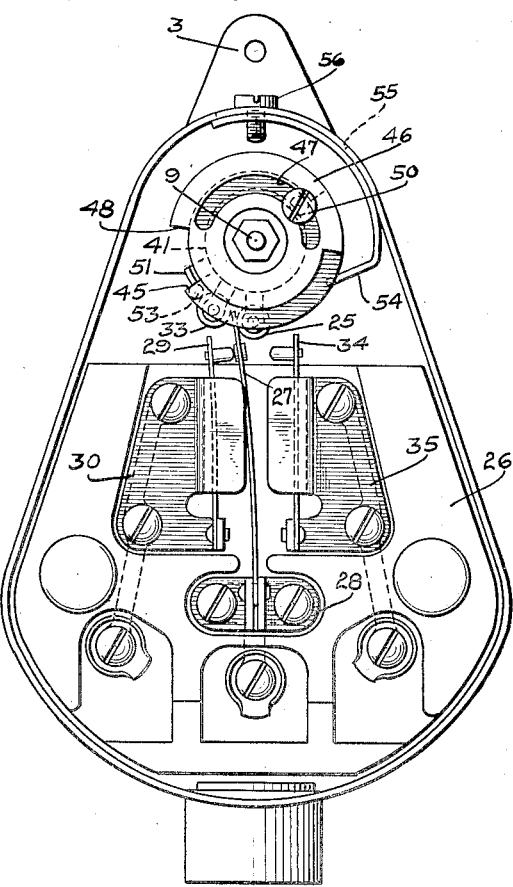
INVENTOR
DANIEL G. TAYLOR
ATTORNEYS Patented Feb. 13, 1934

1,946,598

UNITED STATES PATENT OFFICE 1,946,598

THERMOSTATIC SWITCH

Daniel G. Taylor, Minneapolis, Minn., assignor to Minneapolis-Honeywell Regulator Company, Minneapolis, Minn., a corporation of Delaware Application May 22, 1931. Serial No. 539,224

26 Claims. (Cl. 200—138)

This invention relates to improvements in thermostatic switches well adapted for use in the control of heat producing apparatus. One use of the device is described in a copending application of Ernest M. Miller for Control apparatus filed April 21, 1930, Serial Number 446,160, although the invention herein is not limited to control of the particular system just mentioned.

Objects of the invention are: to provide means for moving a switching element from one control position to another; to provide means for timing motion intervals; to provide means for automatically differentially relatively varying the motion intervals in opposite directions; to provide temperature controlled switch and means for delaying or accelerating switching action; to provide additional means for varying the switching periods; to provide a thermally operated switch control device by which, during the first portion of rise in temperature of the thermal element, a contact can be quickly broken, and by means of which another contact can be made on continued temperature run in the same direction at the end of some predetermined interval, and in which on a reversal of temperature, the contact last to close is opened quickly and then the closing of the other contact is delayed; to provide a switch control element operated by a pair of abutments, in which the abutments are independently movable, and in which each abutment is adapted to move the control element in a different direction, and to provide means frictionally resisting independent motion of the abutments, with a stop for each abutment adapted to limit motion of one abutment while the other is controlling the switch control element; to provide means by which a direct or lost motion connection between the abutments and their operating member is obtainable; to provide a very simplified thermally operable switching mechanism capable of controlling either one or two or more contacts in the manner described; and to provide a thermally operable switch, and means by which switch action is automatically "calibrated" or timed after or during motion to either switch control position.

Objects, features, and advantages of the invention will be set forth in the description of the drawings forming a part of this application, and in said drawings Figure 1 is a vertical longitudinal section through a stack thermostat or combustion responsive switch illustrating one embodiment of this invention;

Figure 2 is a face view with the control mechanism and switches at one limit position; and Figure 3 is a view similar to Figure 2 showing the control mechanism and switches at the opposite limit position.

Referring to Figure 1: Numeral 1 indicates a suitable casing for housing the switch and the principal part of the control mechanism. Numeral 2 indicates a tubular element suitably attached at the back of the casing perpendicularly thereto. This element is adapted to pass through the wall of a stack and may be suitably secured thereto by means such as bracket 3. Partly within the tubular member is a shaft 4, suitably journaled as at 5 at the outer end of the tube, and also journaled at its opposite end in a bearing 7 arranged within the casing 1 and securely attached as at 8 to the rear wall of the casing 1. The shaft 4 has a counter-turned portion 9 which is journaled in the bearing 7, a shoulder 10 being provided which abuts the end of the bearing 7, as shown. A split key 11 near the opposite end of the shaft abuts a washer in turn abutting bearing 5. Shoulder 10 and key 11 cooperate to secure the shaft against excessive movement in one direction. A spiral ribbon or thermostatic element 12 secured at opposite ends as at 13—14 respectively to the tube 2 and shaft 4 constitutes the usual thermostatic means for rotating the shaft conformably to changes in temperature.

Movably (in this instance rotatably) mounted upon the tubular bearing member 7 is a sleeve or support 15 providing a terminal flange 16. The sleeve 15 abuts a shoulder 18 of the bearing 7.

Splined to the sleeve 15 are a series of friction elements generally indicated at 19. Each element is composed of a metallic disk-like cup, said cups being respectively designated 20, 21, 22 and 23. Each cup has therein a friction washer composed in this instance of graphite. The splined connection is obtained by grooving the sleeve longitudinally and by providing projections on the cups which enter the groove or grooves. Between the washers of cups 20—21, and rotatable on the sleeve 15, is a contact actuating disk 24 which has a radial extension upon which is suitably attached a bead of insulating material 25. This bead is adapted to engage one side of and move a resilient switch arm 27 in one direction. The arm 27 is suitably mounted on bracket 28 secured to insulating block 26, which block, in turn, is suitably fastened within the casing, as shown.

When the shaft 4 is rotated, in clockwise direction, in this instance corresponding to temperature fall, the arm 27 is moved toward and finally against another resilient contact element 29, herein referred to as the "cold" contact. The contact 29 is mounted on a suitable plate 30. Mounted between the friction washers of cups 22—23 is a plate 31 also having a radial extension to which is suitably secured a bead 33 of insulating material adapted to engage the opposite side of the switch arm 27 when the shaft 4 is rotated in counter-clockwise direction due, in this instance, to rise in temperature. When moved by the element 33, the arm 27 (after a predetermined degree of movement) engages a resilient contact arm 34, herein referred to as the "hot" contact. The contact 34 is mounted on a plate 35 secured to the insulating base 26.

A coil spring 40 surrounds the sleeve 15 and engages the disk 23 and is held under compression by plate 41 suitably secured as at 42 to the sleeve 15. By this means, the elements 20, 24, 21, 22, 31 and 23 are held in frictional engagement. Sufficient frictional resistance is provided to obtain motion of element 27 to circuit closed position against either contact 29 or 34. After closure of the corresponding contact, the frictional force is overcome and rotation of the support 15 may continue independently of the plates 24, 31. The position of the parts in Figure 2 corresponds to the "hot" condition of the thermostatic element 12 with the "hot" contact 34 closed. In Figure 3, the parts are shown in the "cold" position and, therefore, with contact 29 closed.

In order to obtain a rotation of element 15 as the result of rotation of the shaft 4, the terminal of the counter-turned portion 9 is threaded as at 43 and engaged with the threads is a disk 44. This disk is screwed to its limit, as shown, and is peripherally formed to provide a shoulder 45. Rotatable upon the reduced portion 9 of the shaft is a plate 46 slotted as at 47 and formed to provide a radial shoulder 48. A set screw 50 passing through the slot 47 and threaded into the disk 44, provides means for securing the plate for rotation with the disk. The plate 41 is provided with an extension 51 which lies in the path of shoulders 48 and 45, and it will be seen that by properly adjusting the plate 46, a lost motion connection can be provided whereby the element 4 can move a certain distance before element 51 is engaged by either of the shoulders 45—48 to entrain the sleeve 15, and, therefore, move the beads 25—33. It is also seen that by adjusting the disk 46, both shoulders may be brought into engagement with the element 51 so that the element 15 assumes a fixed relation relative to shaft 4.

When the element 12 is sufficiently cold, the bead 33 is engaged with an element 53, herein called a calibration stop and the control element 27 is engaged with bead 33 and with the cold contact 29, and bead 25 is engaged with the control element 27, to hold it in switch-closed position. This is true whether the stops 45 and 48 are both engaging the element 51, or not. The shoulder 45 is the one which acts, on clockwise motion of the shaft 4 or on cooling motion, to engage and move the element 51.

An adjustable "calibration" stop 54 is provided for limiting the motion of the bead 25 in anti-clockwise direction, the stop, in this instance, comprising an arcuate piece of metal conforming to the configuration of the arcuate wall of the casing 1, which wall is slotted as at 55. Passing through the slot, and in threaded connection with an opening in the element 54, is a set screw 56. Increasing the space between shoulders 45—48 delays the closing of the hot contact. Shoulder 48 engages arm 51 to move bead 33 in hot contact closing direction. Increasing the spacing between stops 53 and 54, by moving stop 54, delays closing of the cold contact, and shoulder 45 engages arm 51 to move bead 25 in cold contact closing direction. Increased spacings between shoulders 45, 48 and stops 53 and 54 are additive to increase the delay in closure of the cold contact.

*Operation*

It will first be assumed that the shoulders 45—48 are both engaging the element 51 and that, therefore, sleeve 15 has a fixed relation to the shaft whatever its rotative direction. Now assume an anti-clockwise motion of the shaft from its position in Figure 3, due to temperature rise. During the first part of the movement, the contact 29 is opened, due to release of element 27 as the bead 25 moves away. The element 27 is now forcibly moved by the bead 33 and hot contact 34 is finally closed. On continued temperature rise, slippage of disk 33 takes place because continued motion of the bead 33 is prevented by switch control element 27 acting as a stop. However, bead 25 moves away from element 27 and the friction connection for the disk 31 enables it to forcibly hold the switch element 27 against contact 34. Since the bead 33 is being held, and the bead 25 is moving a predetermined calibration or spacing between the beads 33 and 25 in direction of motion results, the degree of which calibration is determined by the position of the stop 54 which the bead 25 engages, and the spaced relation between the beads remains the same (for any given "setting") whatever the degree of continued rotation of the shaft 4 in counter-clockwise direction may be. When the temperature begins to fall and the shaft 4 begins to rotate in clockwise direction the beads begin to move also in clockwise direction and when the temperature has dropped sufficiently, in this instance after a comparatively small temperature drop, bead 33 releases switch arm 27 to open hot contact 34. Due to the spaced relation of beads 33—28 the engagement of bead 25 with the arm 27 will be delayed until the temperature has fallen sufficiently, at which time the bead 25 causes element 27 to close cold contact 29. After bead 33 has released 27 and while bead 25 is advancing to cause a closure of the cold contact 29, bead 33 engages stop 53 and as the motion continues, the space between the beads is lessened in direction of motion, and a calibration results by which the bead 25 is positioned to open contact 29 and close 34 in a relatively short period of time or after a small degree of rotation of shaft 4 in anti-clockwise direction. Calibrations respectively for short and long periods are thus automatically obtained. However, other calibrations of varying periods and varying ratio may be obtained. With the device set as shown in Figure 3, the contact 29 will be opened after a rotation of about twelve angular degrees of the control shaft, due to close spacing between the abutments. The hot contact 34 will be closed after an angular motion of about sixty-seven degrees of the control member. On continued temperature rise after closure of 34, the shaft will rotate in counter-clockwise direction and the wide spacing calibration will take place between the abutments as shown in Figure 2. On cooling of the thermostatic element the contact 34 is opened after the shaft has rotated about twelve angular degrees, but the contact 29 will only be closed after an angular motion of about ninety-six degrees because of the previous wide spacing calibration.

I claim as my invention:

1. A switch having a control element, means for moving the control element to opposite switch control positions in response to varying physical conditions, and means for automatically differentially varying the control action to obtain a quicker control action in one direction than in another.

2. A switch having a control element, means for moving the control element to opposite switch control positions in response to varying physical conditions, and adjustable means for automatically differentially varying the control action of said control element moving means to obtain a quicker control action in one direction than in another.

3. A switch control element, a pair of abutments independently movable, each adapted to move the control element in a different direction, means frictionally resisting independent motion of the abutments, and means for operatively controlling the abutments.

4. A switch control element, and means limiting its motion at two control positions, a pair of abutments independently movable, each adapted to move the control element in a different direction, means frictionally resisting independent motion of the abutments, means for operatively controlling the abutments, and a stop for each abutment adapted to limit motion of one abutment while the other is controlling the switch.

5. A switch control element and means limiting its motion at two control positions, a bearing having a shaft therein, a mounting rotatable on the bearing, a pair of abutments independently rotatable upon the mounting, each adapted to move the control element in a different direction, means frictionally resisting independent motion of the abutments, and means by which either a direct or a lost motion connection between shaft and mounting is obtainable.

6. A switch control element and means limiting its motion at two control positions, a bearing having a shaft therein, a mounting rotatable on the bearing, a pair of abutments independently rotatable upon the mounting and each adapted to move the control element in a different direction, means yieldably frictionally resisting independent motion of the aubtments, and means by which the shaft operates the abutments.

7. A switch control element and means limiting its motion at two control positions, a bearing having a shaft therein, a mounting rotatable on the bearing, a pair of abutments independently rotatable upon the mounting and each adapted to move the control element in a different direction, means frictionally resisting independent motion of the abutments, means by which the shaft operates the abutments, and a stop for each abutment adapted to limit motion of one abutment while the other is controlling the switch.

8. In a device of the class described, means adapted for automatically reversing its motion conformably to varying physical changes, a switch control element and two contacts alternatively controllable thereby and adapted to limit control element motion, a pair of abutments independently movable and means frictionally resisting their independent motion, means by which the abutments are controlled by said first mentioned means, said abutments being arranged to alternatively engage and forcibly move said control element against the contacts, and a stop for each abutment adapted to limit its motion in a direction away from the control element.

9. A shaft, a thermal element for reversely rotating it conformably to temperature changes, a control element and contacts adapted to be alternatively controlled thereby, said element being biased to move automatically to non-control position with respect to both contacts, a pair of aubutments independently movable and means frictionally resisting their independent motion, said abutments adapted to alternatively forcibly move said control element against the contacts, and means adapting the shaft to operate said abutments.

10. A shaft and thermal element for reversely rotating it conformably to rise and fall of temperature, a control element and contacts adapted to be alternatively controlled thereby, said element being biased to move automatically to non-control position with respect to both contacts, a support rotatably mounted upon said shaft, two abutments rotatable upon said support each adapted to move the control element to a different control position, means yieldably connecting the abutments for rotation in unison, means connecting the support for rotation by the shaft, and a calibration stop for each abutment adapted to limit motion of one abutment while the other is controlling the switch.

11. Switching means, means for controlling said switching means by motion in either direction, means for operating the last mentioned means to vary the speed of control action conformably to the direction of motion, including means by which it is conditioned for such action after arrival of said controlling means at a given control position.

12. First and second switch contacts, means for controlling the contacts by motion in either direction, means for operating the last mentioned means to vary the speed of the switch control action conformably to the direction of motion, including means by which it is conditioned for such action after arrival of said contact controlling means at a given control position.

13. First and second switch contacts, means for controlling the contacts by motion in either direction, and means for limiting its motion, means for operating the last mentioned means to differentially vary the speed of control action conformably to the direction of motion, including means for conditioning the speed varying means for such varied action after the motion of the controlling means in a given direction has been limited.

14. First and second switch contacts and means movable in opposite directions for controlling said contacts, and additional means for relatively rapidly opening the first contact and closing the second when moving in one direction and for relatively rapidly opening the second contact and delaying closure of the first when moving in an opposite direction.

15. First and second switches and means movable in opposite directions for controlling said switches, and additional means for relatively rapidly opening the first switch and thereafter closing the second switch when moving in one direction and for relatively rapidly opening the second switch and delaying closure of the first switch when moving in an opposite direction.

16. In a device of the class described, an actuator movable in reverse directions, an abutment, continuously acting slip frictional connecting means connecting said actuator and abutment, a switch controlling element engageable by the abutment and movable thereby to one circuit controlling position on movement of the actuator in one direction, and means associated with the abutment for limiting movement thereof in the opposite direction upon reverse movement of said actuator, said slip friction connecting means permitting continued unrestricted movement of said actuator after said abutment reaches its limit of motion.

17. In a device of the class described, an actuator movable in reverse directions, an abutment, continuously acting slip frictional connecting means connecting said actuator and abutment, a switch controlling element engageable by the abutment and movable thereby to one circuit controlling position on movement of the actuator in one direction, and adjustable means associated with the abutment for adjustably limiting movement of the abutment in the opposite direction whereby the amount of movement of the actuator required for operating the switch control element by the abutment may be varied, said slip friction connecting means permitting continued unrestricted movement of said actuator after said abutment reaches its limit of motion.

18. In a device of the class described, a coiled thermostatic element having one of its ends stationary, an abutment, continuously acting slip frictional connecting means connecting the abutment and the other end of the coiled thermostatic element, a switch controlling element engageable by the abutment for movement thereby in one direction, and a stop engageable by the abutment on movement thereof in the opposite direction, said slip friction connecting means permitting continued movement of said thermostatic element after said abutment engages said stop.

19. In a device of the class described, an actuator movable in reverse directions, an abutment, continuously acting slip frictional means connecting the abutment to said actuator, a switch controlling element normally biased to one position and engageable by the abutment for movement to another position when said actuator moves the abutment in one direction, and stop means for limiting movement of the abutment away from the switch controlling element when the actuator moves the abutment in the opposite direction.

20. A device of the class described, comprising, a coiled thermostatic element having one of its ends relatively stationary and its other end being capable of unlimited arcual movement in response to temperature changes, a switch controlling element normally biased to one position and movable through a relatively narrow range to a second position, an abutment engageable with the switch controlling element for moving the same to its second position, said switch controlling element then preventing continued movement of the abutment, continuously acting slip frictional means connecting the abutment to the movable end of the thermostatic element, and a stop engageable by the abutment for limiting its movement in the opposite direction, said slip frictional connecting means permitting continued arcual movement of the thermostatic element after the abutment has reached either of its limits of movement.

21. A device of the class described, comprising, a device adapted for automatically reversing its motion conformably to varying physical conditions, a switch control element, means for limiting its motion in at least one direction, and means for operatively connecting said device to the switch control element, said means comprising a lost motion connecting mechanism and a continuously acting slip frictional connecting mechanism.

22. A device of the class described, comprising, in combination, a coiled thermostatic element having one of its ends fixed whereby the other end thereof is movable in an unlimited arcual path, a pair of spaced relatively stationary contacts, a switch arm having a portion disposed between said spaced relatively stationary contacts, a pair of abutments, one of said abutments being adapted to engage one side of said switch arm and move it into engagement with one of said contacts and the other abutment being adapted to engage the other side of said switch arm and move it into engagement with the other of said contacts, means for limiting the movement of said abutments in a direction away from said switch arm, and non-positive transmission means connecting said abutments to the free end of said coiled thermostatic element.

23. A device of the class described comprising, in combination, a coiled thermostatic element having one of its ends fixed whereby the other end thereof is movable in an unlimited arcual path, a pair of spaced relatively stationary contacts, a switch arm having a portion disposed between said spaced relatively stationary contacts, a pair of abutments, one of said abutments being adapted to engage one side of said switch arm and move it into engagement with one of said contacts and the other abutment being adapted to engage the other side of said switch arm and move it into engagement with the other of said contacts, means for limiting the movement of said abutments in a direction away from said switch arm, and non-positive transmission means connecting said abutments to the free end of said coiled thermostatic element, said switch arm being flexible and normally assuming a position out of engagement with both of said contacts.

24. A device of the class described, comprising, in combination, a flexible member fixed near one end and having its other end free, a rotatable arm having a portion engageable with said flexible member upon rotation in one direction, said flexible member when engaged by said arm preventing further substantial movement thereof, means for limiting movement of said arm in the reverse direction, an actuator movable in reverse directions, and non-positive transmission means connecting said actuator and arm, said non-positive transmission means permitting further movement of said actuator when said arm has been moved to either of its limits of motion and substantially immediately reconnecting said actuator and arm upon initial reverse movements of said actuator.

25. A device of the class described comprising, in combination, a flexible member fixed near one end and having its other end free, a rotatable arm having a portion engageable with said flexible member upon rotation in one direction, said flexible member when engaged by said arm preventing further substantial movement thereof, means for limiting movement of said arm in the reverse direction, a coiled thermal actuator having one end fixed whereby its other end moves through a substantially unlimited range upon changes in the temperature to which it responds, a torsion rod operatively connected to the movable end of said coiled thermal actuator, and continuously acting yielding slip friction connecting means connecting said arm and torsion rod.

26. A device of the class described comprising, in combination, a flexible member fixed near one end and having its other end free, a rotatable arm having a portion engageable with said flexible member upon rotation in one direction, said flexible member when engaged by said arm preventing further substantial movement thereof, means for limiting movement of said arm in the reverse direction, a coiled thermal actuator having one end fixed whereby its other end moves through a substantially unlimited range upon changes in the temperature to which it responds, a torsion rod operatively connected to the movable end of said coiled thermal actuator, slip friction connecting means connecting said arm and torsion rod, and means engageable with said flexible member upon movement of said arm away from said flexible member.

DANIEL G. TAYLOR.